United States Patent
Nielsen et al.

(10) Patent No.: US 7,497,977 B2
(45) Date of Patent: Mar. 3, 2009

(54) METHODS AND SYSTEMS FOR PRODUCING AN OBJECT THROUGH SOLID FREEFORM FABRICATION BY VARYING A CONCENTRATION OF EJECTED MATERIAL APPLIED TO AN OBJECT LAYER

(75) Inventors: Jeffrey A. Nielsen, Corvallis, OR (US);
Steven T. Castle, Philomath, OR (US);
David C. Collins, Philomath, OR (US);
Shawn Hunter, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1084 days.

(21) Appl. No.: 10/354,538

(22) Filed: Jan. 29, 2003

(65) Prior Publication Data
US 2004/0159978 A1    Aug. 19, 2004

(51) Int. Cl.
*B29C 41/02*    (2006.01)

(52) U.S. Cl. .......................... 264/113; 264/308; 347/54
(58) Field of Classification Search .................. 264/208, 264/113, 308; 347/54
See application file for complete search history.

(56) References Cited

U.S. PATENT DOCUMENTS

| 5,510,066 | A | * | 4/1996 | Fink et al. .................. 264/40.1 |
| 5,650,858 | A | | 7/1997 | Lund |
| 6,146,567 | A | | 11/2000 | Sachs et al. |
| 6,214,279 | B1 | * | 4/2001 | Yang et al. .................. 264/482 |
| 6,405,095 | B1 | * | 6/2002 | Jang et al. .................... 700/118 |

FOREIGN PATENT DOCUMENTS

WO    WO 97/17664    5/1997

\* cited by examiner

*Primary Examiner*—Leo B Tentoni

(57) ABSTRACT

A method of producing an object through solid freeform fabrication includes varying a concentration of ejected material applied to form a particular object layer.

5 Claims, 7 Drawing Sheets

US 7,497,977 B2

METHODS AND SYSTEMS FOR PRODUCING AN OBJECT THROUGH SOLID FREEFORM FABRICATION BY VARYING A CONCENTRATION OF EJECTED MATERIAL APPLIED TO AN OBJECT LAYER

BACKGROUND

Solid freeform fabrication is a process for manufacturing three-dimensional objects, for example, prototype parts, models and working tools. Solid freeform fabrication is an additive process in which an object, which is described by electronic data, is automatically built, usually layer-by-layer, from base materials.

Several principal forms of solid freeform fabrication involve a liquid ejection process. There are two main types of solid freeform fabrication that use liquid-ejection: binder-jetting systems and bulk-jetting systems.

Binder-jetting systems create objects by ejecting a binder onto a flat bed of powdered build material. Each powder layer may be dispensed or spread as a dry powder or a slurry. Wherever the binder is selectively ejected into the powder layer, the powder is bound into a cross section or layer of the object being formed.

Bulk-jetting systems generate objects by ejecting a solidifiable build material and a solidifiable support material onto a platform. The support material, which is temporary in nature, is dispensed to enable overhangs in the object and can be of the same or different material from the object.

In both cases, fabrication is typically performed layer-by-layer, with each layer representing another cross section of the final desired object. Adjacent layers are adhered to one another in a predetermined pattern to build up the desired object.

In addition to selectively forming each layer of the desired object, solid freeform fabrication systems can provide a color or color pattern on each layer of the object. In binder-jetting systems, the binder may be colored such that the functions of binding and coloring are integrated. In bulk-jetting systems, the build material may be colored.

Inkjet technology can be employed in which a number of differently colored inks are selectively ejected from the nozzles of a liquid ejection apparatus and blended on the build material to provide a full spectrum of colors. On each individual layer, conventional two-dimensional multi-pass color techniques and half-toning algorithms can be used to hide defects and achieve a broad range of desired color hues.

One of the on-going deficiencies of the solid freeform fabrication techniques described above is that by building the object with discrete layers, the layers may still be apparent in the finished product. This is especially an issue with objects that have vertically contoured surfaces where the contours spread across multiple layers and create a layering artifact. This is commonly described as "terracing." The terracing effect leaves noticeable visual and textural "stair steps" at each successive layer along a contour.

This phenomenon is illustrated in FIGS. 1a-c. As shown in FIG. 1a, it may be desired to form a smooth, contoured outer surface (100) of an object. However, the contoured surfaces must be built of stacked layers of build material. Therefore, typical freeform fabrication techniques create discrete layers (102) that attempt to approximate or match the desired surface (100) contour. As shown in FIG. 1b, the build layers (102) are arranged like stairs in an attempt to approximate the desired surface contour (100).

Consequently, the resolution of prior freeform fabrication techniques is limited by the thickness (T) of the layers (102). The actual shape (104, FIG. 1c) of the surface may be a noticeably terraced set of distinct layers (102) instead of a smooth contour as desired.

One solution to the terracing problem is to use thinner layers to build the object. As the layers become thinner, the terraces become shallower and thus less distinct and noticeable. However, by adding additional layers, the throughput of the system is reduced and the object production speed is significantly diminished. The more layers that are needed to build a product, the more time it takes to build that product.

Furthermore, by using thinner layers to produce an object, the data that must be sent to the fabrication system increases. If, for example, the layer thickness is reduced by half, the number of layers (and the data defining those layers) doubles.

In some instances, the data cannot be sent to a fabricator at a high enough rate to enable efficient production of the thinner layers. Thus, even if the decision is made to use thinner layers to reduce terracing, the data sometimes cannot get to a fluid ejector at a high enough rate to result in efficient object production. In these cases, either the fabricator is slowed down to allow the data to transfer, or the same data may be erroneously used to build more than one layer.

SUMMARY

In one of many possible embodiments, the present invention provides a method of producing an object through solid freeform fabrication by varying a concentration of ejected material applied to form a particular object layer.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

The present specification describes techniques for creating objects by a solid freeform fabrication system, preferably using fluid ejection technology, while reducing the effects of terracing described above. As used in this specification and the appended claims, the term "ejected material" is used broadly to mean any substance ejected by a fluid ejection head to color, bind or form a portion of an object being fabricated. Consequently, "ejected material" includes, but is not limited to, ink, colorant toner, binder, build material and support material. The term "ink" is used to mean any material for coloring an object or build material in a freeform fabrication system. "Ink" includes, but is not limited to, ink, printing fluid, toner, colorant, etc. The term "binder" refers to adhesives or any other substances that are ejected to selectively bind a build material together into a desired product. "Build material" is any material from which a freeform fabrication system forms a desired product and may include a powdered build material or a jetted build material, such as a jetted polymer. The term "voxel" describes a volumetric pixel, which is an addressable volume having length in x, y, and z coordinates. The term "sub-voxel" describes a subset of a voxel, where a voxel is made up of many sub-voxels. For example, if a voxel were divided in half in all three axes, it would result in 8 sub-voxels. A voxel comprised of sub-voxels may also be referred to as a super-voxel. Also, the terms "small" and "large" indicate relative sizes to one another, and do not indicate any specific size, volume, mass, or shape.

Figure 2:
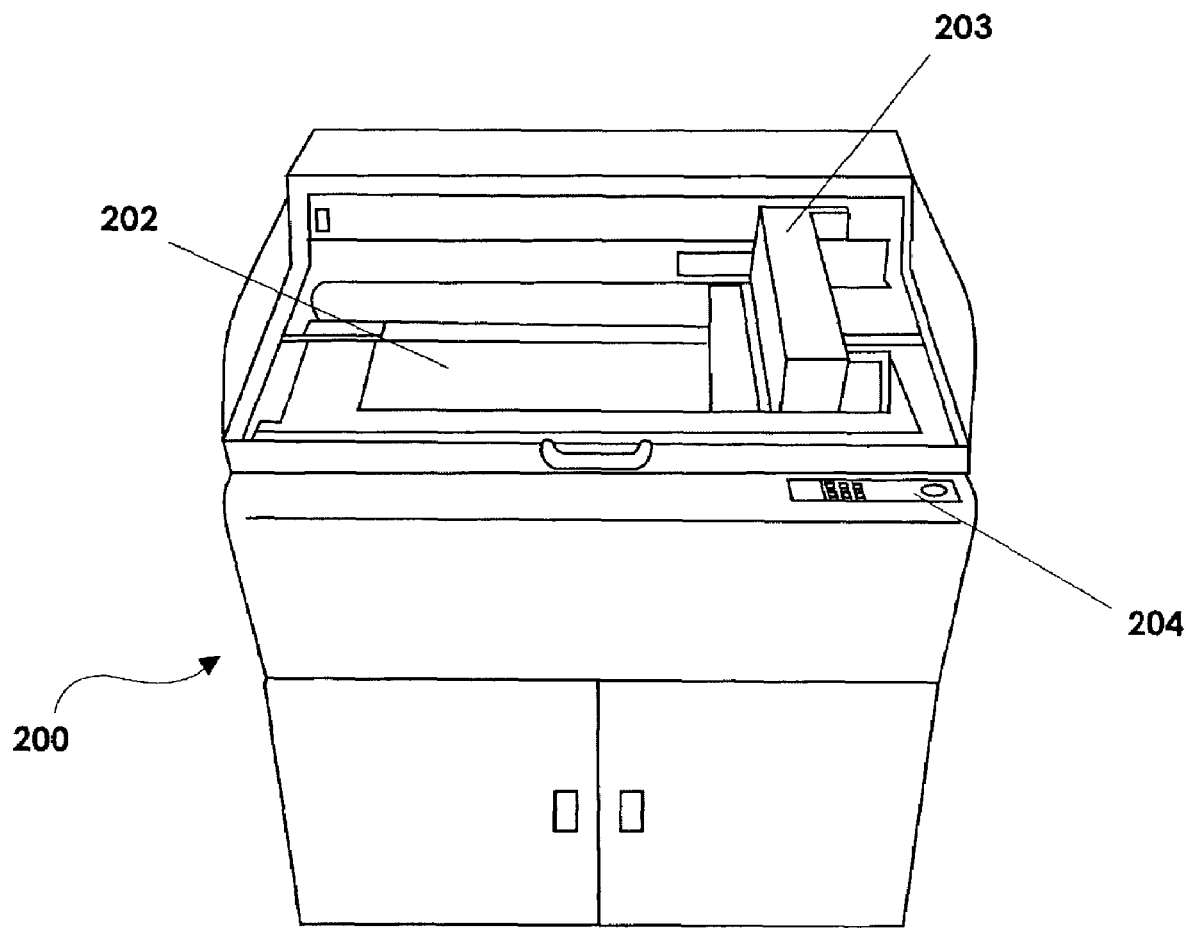
FIG. 2 is a perspective view of a solid freeform fabrication system that may be used to implement embodiments of the present invention.

Referring now to the figures, and in particular to FIG. 2, one solid freeform fabrication system using liquid ejection technology is described. Embodiments of the present invention may be incorporated into the freeform fabrication system shown. As noted above, the freeform fabrication system may be a binder-jetting system or a bulkjetting system. For simplicity, we describe the solid freeform fabrication system (200) of FIG. 2 in terms of a binder-jetting system.

In the solid freeform fabrication system (200) of FIG. 2, a build material such as a bulk powder substance is used to form each individual layer of a desired object. To build each layer, a quantity of powder is provided from a supply chamber. A roller, preferably incorporated into a moving stage (203), distributes and compresses the powder to a desired thickness at the top of a fabrication chamber (202).

A liquid ejection apparatus (e.g. a drop-on-demand liquid ejection apparatus, etc.) may be contained by the moving stage (203) of the solid freeform fabrication system (200). Alternatively, the solid freeform fabrication system (200) may include multiple liquid ejection apparatuses, each separately containing one or more ejection fluid. The printheads may also be separate from the moving stage (203) according to some embodiments.

When the moving stage (203) has distributed the powder, the fluid ejection apparatus deposits adhesive or binder onto the powder in the fabrication chamber (202) in a two dimensional pattern. This two dimensional pattern is a cross section of the desired object being fabricated.

Alternatively, the fluid ejection apparatus may selectively deposit a build material, such as a jetted polymer, to form the desired product or a cross-section of the desired product. The binder or build material may be colored with ink, toner, or other materials to provide a desired color or color pattern for particular cross sections of the desired product.

If binder is being used in a powdered build material, the powder becomes bonded in the areas where the binder is deposited, thereby forming a solid layer of the desired product. The process is repeated with a new layer of powder being applied over the top of the previous layer in the fabrication chamber (202). A next cross section of the desired product may then be built by ejecting binder into the new powder layer. In addition to forming each cross-sectional layer of the product being fabricated, the adhesive binder can also bind adjacent or successive layers together.

Whether ejecting a binder into a powdered build material or ejecting a fluid build material, the process continues until the desired object is entirely formed within the fabrication chamber (202). Any extra powder that is not bonded, or ejected support material, may be removed leaving only the fabricated object. A user interface or control panel (204) is provided to allow the user to control the fabrication process.

The moving stage (203) of the solid freeform fabrication system (200) often includes inkjet technology, such as a drop-on-demand liquid ejection apparatus, for ejecting material to form or color the layers of the desired object. Using drop-on-demand technology, the moving stage (203) may include one or more drop-on-demand printheads (as discussed above) to eject drops of material that are clear or colored in a selective pattern to create the object being fabricated.

In the example of a freeform fabrication system that uses selective ejection of a binder into a powdered build material, it has been the conventional practice to eject an equal amount of binder into each unit volume of the build material that is to be formed into a layer of the object being fabricated. As used herein, the term "concentration" refers to an amount of binder added to a unit volume of the build material. Under the principles disclosed herein, the concentration of the binder added to a unit volume of build material may vary.

For example, a conventional freeform fabrication process may eject a certain amount of binder per square millimeter at all locations of an object layer. The binder then penetrates into and binds a volume of build material in a uniform manner. Alternatively, the conventional system may eject a certain volume of build material at all locations of an object layer. Under the principles described herein, the amount of binder or build material added across an object layer may be varied to reduce the effects of terracing.

Preferably the variation in the concentration of the binder or build material applied is continuous or graduated over a transition region between succeeding layers of the object being formed. "Continuous" or "graduated" variation refers to anything more than two discrete material ejection densities over a layer of the object being fabricated.

Figure 1A:
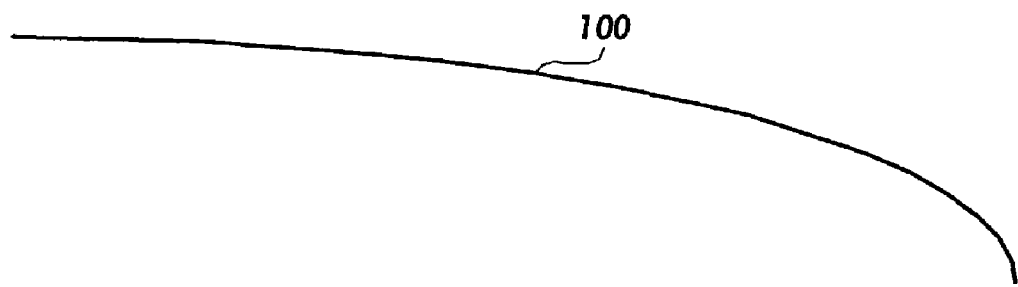
FIGS. 1a-c illustrate an example of terracing when discrete, finitely-thick layers are used to build a contoured surface.
Figure 1B:
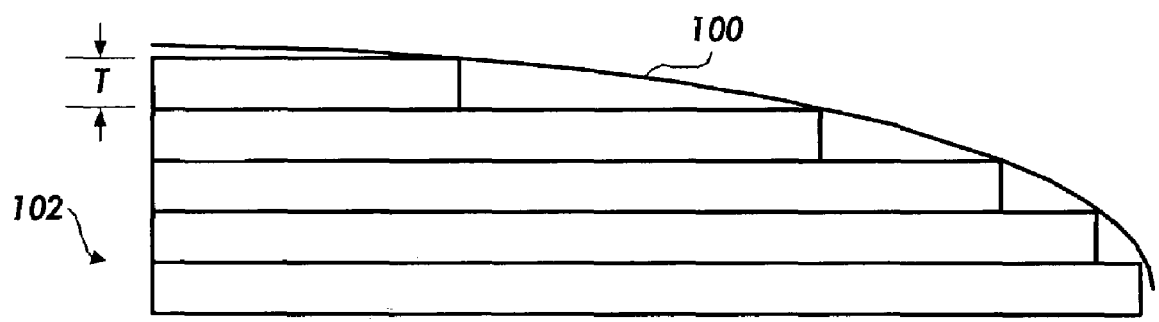
Figure 1C:
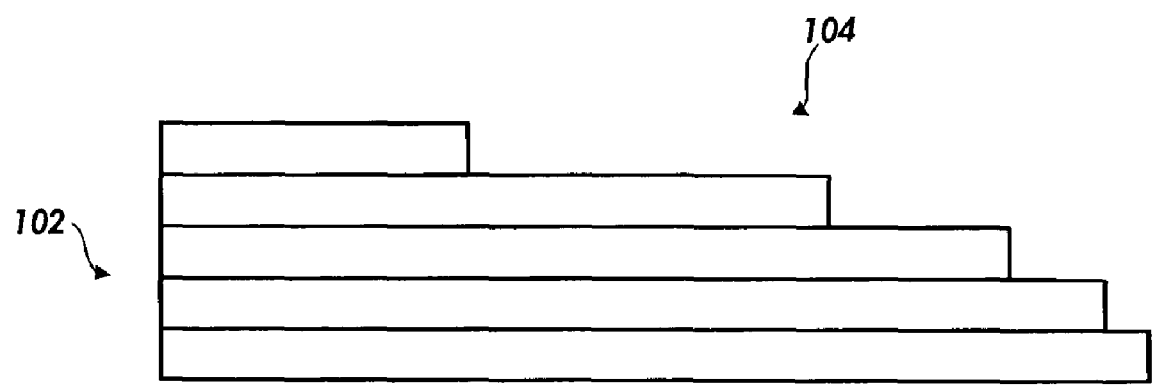

By varying the amount of binder or build material deposited, the thickness of the layer at that point is increased or diminished from the standard layer thickness (T, FIG. 1). Consequently, the effects of terracing are reduced.

Figure 3A:
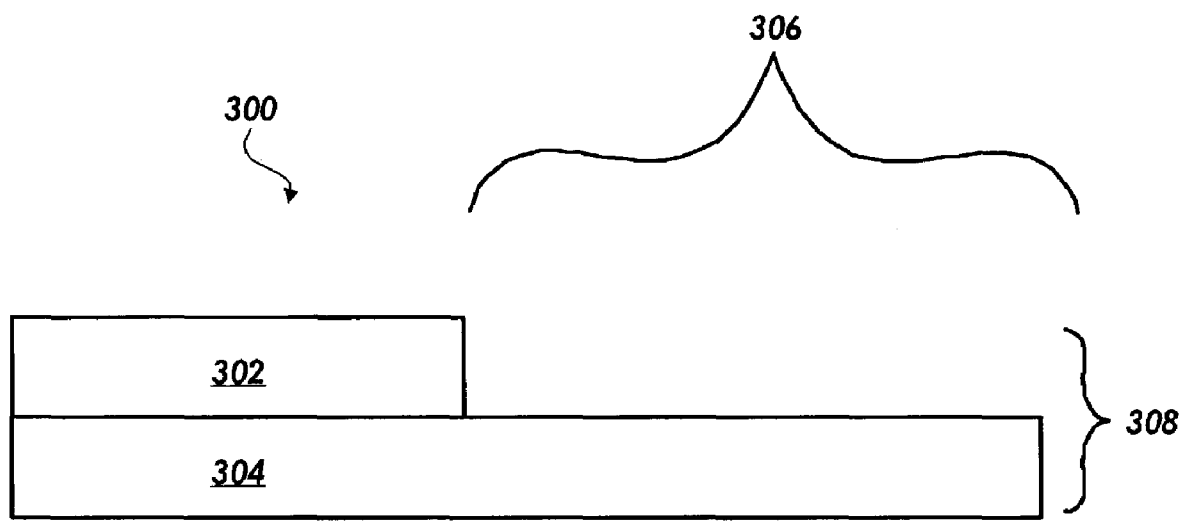
FIGS. 3a-b are side views of object layers used to build a contoured surface according to one embodiment of the present invention.
Figure 3B:
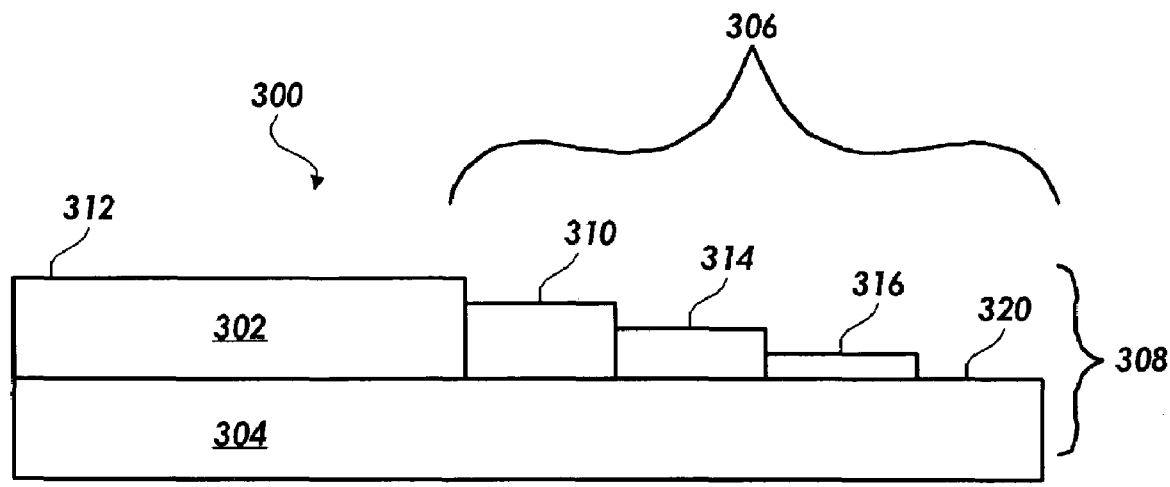

FIGS. 3a and 3b illustrate the result of varying the applied concentration of binder to a build material, or varying the amount of build material deposited at different parts of the object layer. FIG. 3a illustrates adjacent layers (302 and 304) of an object (300) with no variation in binder concentration at a transition region (306) between successive terraced layers (308). In contrast, FIG. 3b illustrates the same transition region (306) over which a continuously varying binder concentration or build material quantity has been applied.

The variation in binder application shown in FIG. 3b is a binder concentration reduction that occurs in forming the upper layer (302) over a transition region (306) between the successive terraced layers (308). Transition regions include, but are not limited to, the portions of the object constituting outer curved surfaces or contours of adjacent object layers, such as the two layers (302 and 304) shown.

For example, as shown in FIG. 3b, the concentration of ejected material applied at a first transition area (310) of the upper layer (302) may be 70-90% of a concentration applied at bulk regions (e.g., 312) of the object. A second transition area (314) further reduces the ejected material concentration to 40-60% of the bulk concentration. And a third transition area (316) reduces the ejected material concentration to 5-30% of the bulk concentration. These ranges are merely exemplary and other ranges may be selected as best suited to a particular application.

With varying amounts of ejected material being deposited, correspondingly varying amounts of solidified build material will result. A varying amount of binder ejected will bind varying amounts of powdered build material. A varying amount of ejected build material will solidify into varying heights of solidified build material. In either case, with a graduated variation in ejected material, the result is the more graduated terracing shown in FIG. 3b. The terracing of FIG. 3b is less noticeable and better approximates the desired surface contour than the terracing of FIG. 3a. However, these principles are not limited to topographical variation in height (Z) without simultaneous variation in either X or Y. Thus the concentration could be varied to account for surface variation in either X-Z or Y-Z, or a combination of the two. Thus, the variation in binder concentration shown within the plane of FIG. 3b could also be occurring orthogonally to this plane (into and out of the page) if there were simultaneous variation in height (Z) in this orthogonal plane.

There are at least two methods for varying the concentration of binder or build material ejected in a unit area of the object layer being fabricated. The first is to vary the volume of the drops of ejected material being ejected. The second is to selectively deposit a varying quantity of drops of ejected material in a unit area of the object layer being fabricated.

Figure 4A:
FIGS. 4a-e are top views of the object layers of FIG. 3b.
Figure 4B:
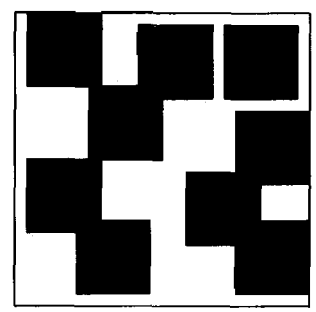
Figure 4C:
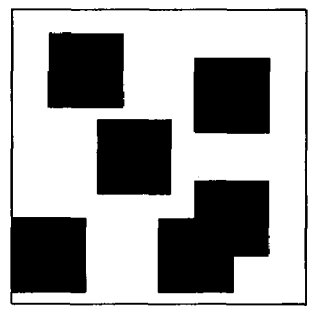
Figure 4D:
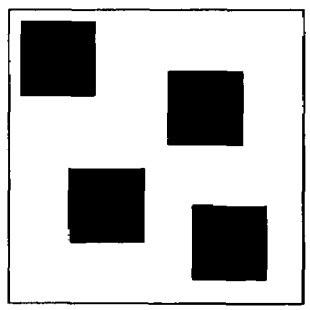
Figure 4E:
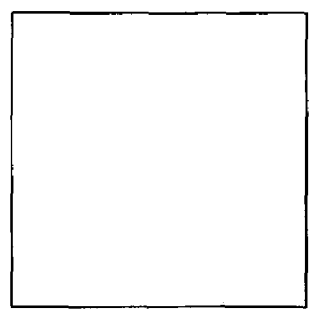

If a variable quantity of drops is ejected, it is preferable to dither or modulate the ejection head to spread the ejected drops within the unit area being covered. Consequently, the amount of ejected material is dithered or modulated over the transition region (306) to create a less pronounced terracing effect and thus a smoother object surface. FIGS. 4a-e show from a top view what a modulated or dithered binder-reduction pattern may look like. In FIGS. 4a-e, dark regions indicate areas where binder or build material are deposited within a given area of the object layer being fabricated. FIG. 4a, shows in top view a 100% concentration, i.e., binder or build material is applied over the entire unit area. This will often be the case in the bulk regions of the object (e.g., 312, FIG. 3b). FIG. 4b shows a 70-90% ejected material concentration region corresponding with first transition area (310) of FIG. 3b. Likewise, FIG. 4c shows a 40-60% ejected material concentration region corresponding with second transition area (314), FIG. 4d shows a 15-30% ejected material concentration region corresponding with the third transition area (316), and FIG. 4e shows a 0% ejected material concentration region. The 0% ejected material concentration may be used at absolute edges (320) of the transition or terraced region (e.g. 306).

The concentration of the ejected material applied at the transition regions (306, FIG. 3b) are, however, not limited to the exemplary figures and percentages shown above. There may be any number of transition areas, and there is no limit to the range of ejected material concentration percentages for each area.

The reduction in ejected material concentration in upper layer (302) over the transition region (306) facilitates a gradual set of steps that better define the transition area than less resolute terracing. Consequently, the discrete layers (302 and 304) of the object become less and less pronounced at the object surfaces because of the variation in ejected material concentration applied to transition areas. If binder is being used in a powdered build material, another method that can be used to mimic the effect of variable concentration of binder is to apply two or more liquids that possess variable binding efficacy. For example, one might have two or more liquids that had, for example, different surface energies, particulate loadings, or binding-component concentrations. If the amount of material that was bound with a particular-sized drop is different between these two or more liquids, then the effect would be similar to the effect achieved by variable-sized drops.

As indicated above, varying the amount of ejected material may be accomplished by limiting the quantity of drops ejected per unit area and dithering the fluid ejection apparatus as material is ejected. Alternatively, varying the amount of ejected material may be accomplished by a fluid ejection apparatus capable of producing various drop sizes. For example, a piezo drop-on-demand ejector is commercially available and can eject different drop sizes from a single orifice. Alternatively, there may also be multiple fluid ejection apparatuses, with certain apparatuses designated for certain drop sizes.

The example described above illustrates a gradual, continuous reduction in the amount of ejected material for the upper layer (302) as the upper layer (303) crosses the transition region (306). The continuous reduction of ejected material application concentration over a transition region (306) is preferably only used at transition regions that form bottom surfaces or upward-sloped terraces of the object being built. However, in some aspects, the use of a continuous reduction in ejected material may also be used at transition regions that form top or downward-sloped terraces of the object.

Figure 5A:
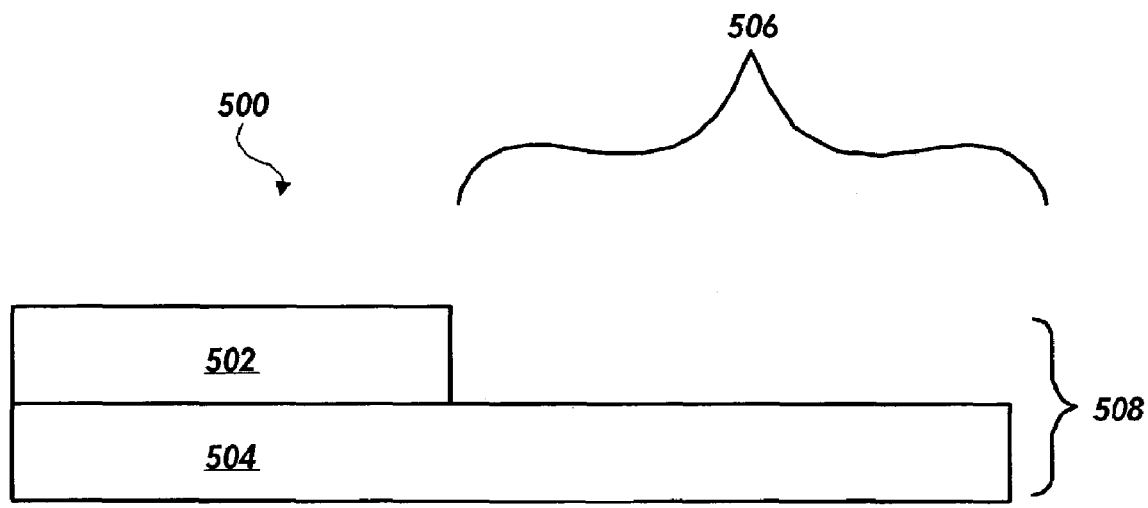
FIG. 5 is a side view of object layers used to build a contoured surface according to another embodiment of the present invention.
Figure 5B:
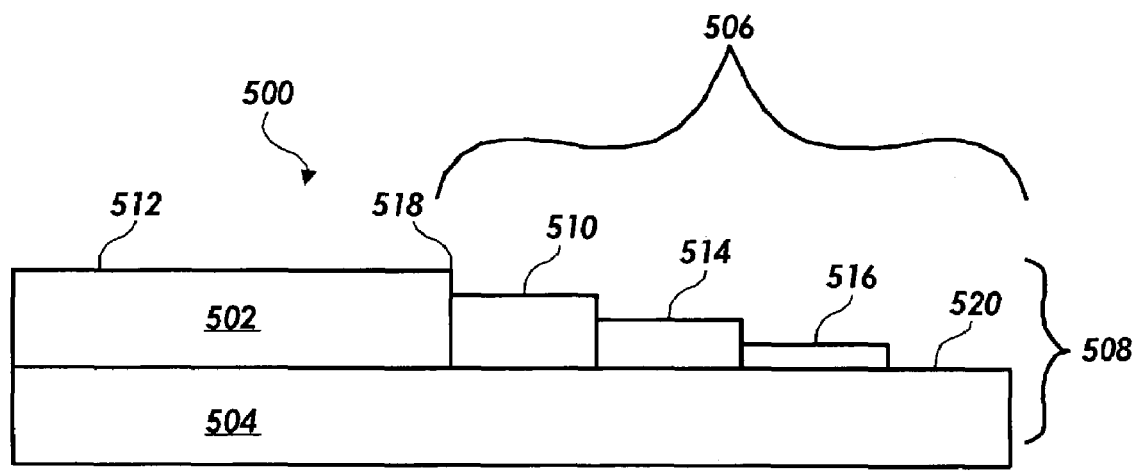

Turning next to FIGS. 5a and 5b, another way in which the ejected material application may be varied is shown. The example described above illustrates a gradual, continuous reduction in the amount of ejected material for the upper layer (302) as the upper layer (303) crosses the transition region (306). The example of FIGS. 5a and 5b describe a continuous increase in the amount of ejected material for a lower layer (504).

For comparison, FIG. 5a shows adjacent layers (502 and 504) of an object (500) with no variation of ejected material concentration at a transition region (506) between successive terraced layers (508). However, according to the embodiment of FIG. 5b, there is a variation in ejected material quantity applied to the lower layer (504) of the transition region (506).

The variation in ejected material application shown in FIG. 5b is an increase in the ejected material concentration of the lower layer (540) of the terrace (508) along the transition region (506). Instead of decreasing ejected material concentration in the upper layer (502), as was the case in FIG. 3a, a continuously increasing amount of ejected material is applied to the lower layer (504) throughout the transition region (506). The amount of additional binder, followed by an application of additional build material over the lower layer (504) creates the more gradual step structure shown in FIG. 5b, which better approximates the desired surface contour. The build material of the bottom layer (504) may be over-saturated with binder such that the application of build material for the top layer (502) facilitates absorption and binding of powder in addition to the powder bound by a separate application of binder to the top layer (502). Similarly, increased amounts of deposited build material for the lower layer (504) produce the same effect in a system that ejects build material rather than binder.

In the exemplary embodiment of FIG. 5b, the concentration of ejected material applied at a first transition area (510) of the bottom layer (502) is about 150-400% of the concentration applied at bulk regions (512) of the object (500). The first transition area (510) begins at a terraced region transition point (518). A second transition area (514) also exhibits an increased ejected material concentration, but to a lesser extent than the first transition area (510). For example the second transition area may have an ejected material concentration of about 120-140% of the bulk region (512) concentration. And a third transition area (516) may have an ejected material concentration of about 100.01-115% of the bulk region (512) concentration. As used herein, 100.01% indicates any percentage greater than 100%. The ejected material concentration may be as low as about 100% of the bulk concentration at the absolute edge (520) of the terraced region (506).

The concentration of the ejected material applied at the transition regions (506) of an object is, of course, not limited to the exemplary figures and percentages shown above. There may be any number of transition areas, and there is no limit to the range of binder concentration percentages of each area.

The increase in ejected material concentration at the transition region (506) facilitates the much smaller set of steps that define the transition region (508) between layers (502 and 504). Consequently, the discrete layers (502 and 504) of the object become less and less discrete at the object surfaces according to the variation in ejected material concentration applied to the bottom layer (504). It will also be understood that while the embodiments of FIGS. 3b and 5b show only a decreasing step size going from left to right, there may be variations in the step sizes of any kind, and need not only be tapered from largest to smallest as shown.

The increased amount of ejected material applied at the transition region (506) may be accomplished by applying larger drop volumes of ejected material, by firing the fluid ejection apparatus multiple times, or by any other convenient method. Further, the increase in ejected material concentration at the transition region (506) is preferably performed at transition regions that form top surfaces or downward-sloped terraces. The use of additional amounts of ejected material at top object surfaces is particularly effective at reducing terracing effects. However, the use of additional amounts of ejected material may also be used at transition regions that form bottom or upward-sloped terraces.

In addition, it is also possible to use a combination of both undersaturating some portions of the build material with binder and oversaturating other portions of the build material with binder, or expressing increased amounts of build material at some points in the fabrication process and expressing decreased amounts of build material at other points in the fabrication process. For example, one may vary the amount of build material at a particular location by reducing the amount of ejected material applied to an upper layer as described above with reference to FIGS. 3a-b, and also increasing the amount of ejected material applied at lower layers as described with reference to FIGS. 5a-b.

As indicated, in addition to solid freeform fabrication systems that apply binder to a powdered build material, the principles described herein may also be applied to solid freeform fabrication systems that eject all of the object and support material from a fluid ejection apparatus. For example, the techniques described herein may be applied to any jetted solidifiable material system that provides 100% of the object build material and/or support material from the fluid ejection apparatus. Jetted solidifiable or hardenable materials include, but are not limited to pre-polymers, polymers, and waxes. Therefore, a solidifiable material solid freeform fabrication system may include applying a variable application configuration of solidifiable material drops in predetermined layer patterns to build an object using different concentrations of ejected material. At each layer of the object, there may be a first set of solidifiable material drops ejected at a first configuration, and a second and more sets of solidifiable material drops of different configurations at terraced regions of the object. In addition, support material concentration may also be varied (such as by drop depletion and/or dithering techniques) to create a more smooth support structure to build the object onto. As shown in FIG. 3b, the concentration of the second or more sets of solidifiable material drops at terraced regions of the object may be less than at bulk regions. The lower concentration configuration may be achieved by reducing the number of drops of solidifiable material per unit area or by using smaller drop masses at the terraced regions. Further, the lower concentration configuration is continuously variable at the terraced regions to any amount just less than the concentration at the bulk regions (<100%), all the way to a zero concentration configuration.

As discussed in the background, often the size of an electronic data set defining an object for production by solid freeform fabrication is too large to be effectively utilized with the fabrication system. Also, in some smaller data sets, the resolution of the object—especially between terraced layers—is poor, leaving pronounced undesirable visual and textural effects on the object surface. Further, sometimes it is simply desirable to increase the resolution of a data set of any size.

Consequently, according to the techniques described herein, a data set representing layers of an object to be produced through solid freeform fabrication may be manipulated with a resolution enhancement technique (RET). In such a technique, the fabrication system (100, FIG. 1) may automatically interpolate between layers and form additional layer characteristics, even when the data flow to the system (100, FIG. 1) cannot support additional specific layer data or when the original data is of low resolution in the Z-axis (thickness of an object being built).

The RET method described herein is similar in concept to writing systems that include resolution enhancement techniques (for example, U.S. Pat. No. 5,650,858, hereby incorporated by reference). However, the enhancement is in the Z-direction for a Z-axis resolution enhancement technique (ZRET).

One application of the ZRET includes sending a high-resolution object data set through a low-resolution data transfer because of constraints on the data transfer rate from a controlling computer to the solid freeform fabrication system (100, FIG. 1), or from data transfer limitations within the system (100, FIG. 1) itself (during, for example, rasterization, color mapping, or halftoning).

Many three-dimensional drawing packages compromise the data set automatically when they create files that are intended for rapid prototyping (STL is a common file format for rapid prototyping) or that are intended for the internet (VRML is a common file format for the internet). The low-resolution data sets may exaggerate terracing effects as a result of the file compression. Therefore, the ZRET may be applied to automatically reduce terracing effects. However, ZRET may be used on any data set, even on data sets that are of high resolution to further improve object surfaces. While one implementation of the ZRET techniques discussed above may afford a significant data savings, the ZRET is not limited to data compression. ZRET may be used to further enhance any solid freeform fabrication data set.

Figure 6A:
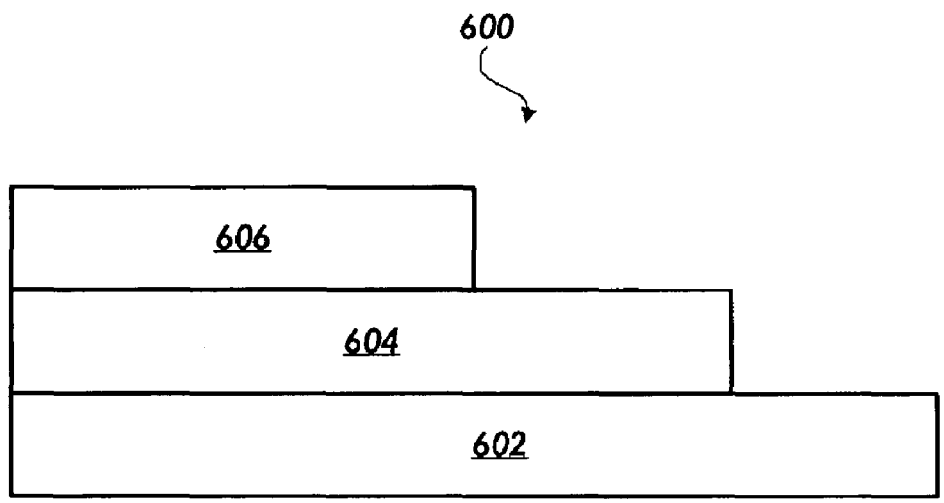
FIGS. 6a-d are side views of a sequence of object layers according to a data manipulation embodiment of the present invention.
Figure 6B:
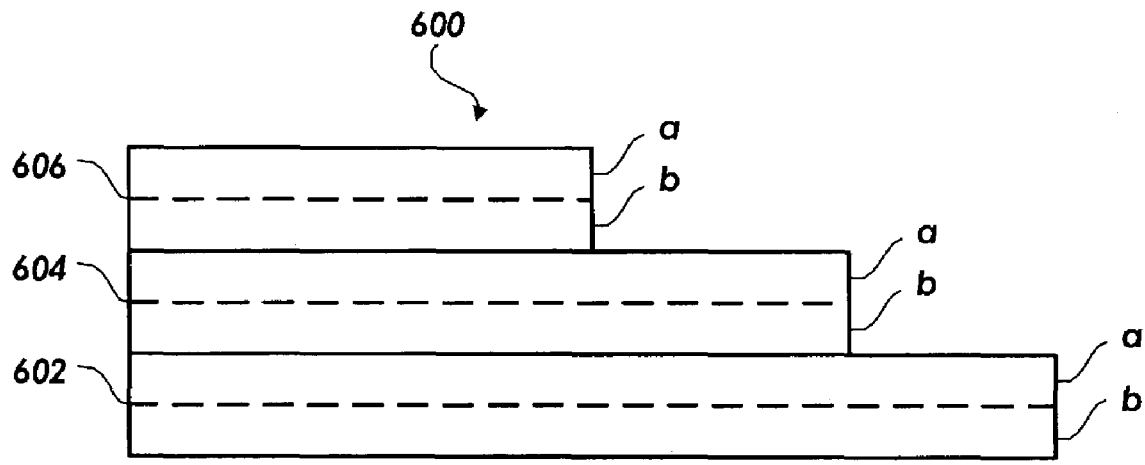
Figure 6C:
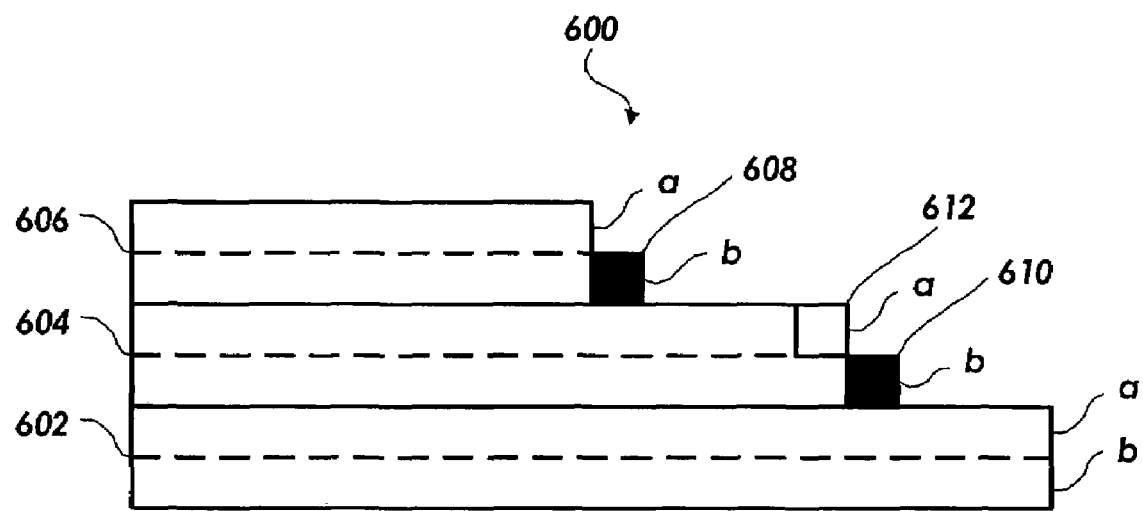
Figure 6D:
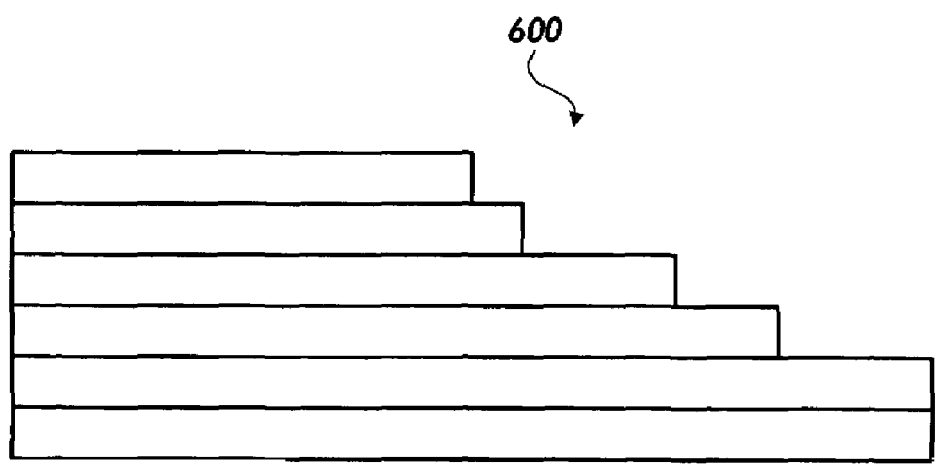

Referring to FIGS. 6a-d, an illustration of one ZRET is shown. FIG. 6a shows a low-resolution voxel data representation of an object (600). The object (600) of FIG. 6a includes first, second, and third layers (602, 604, 606, respectively), which are each one voxel in height. The steps between the three layers are quite pronounced, and will result in rough, visually discrete layers. Therefore, according to the ZRET technique described herein, the solid freeform fabrication system (100, FIG. 1) may be programmed to automatically reduce the terracing effects associated with low-resolution data sets. For example, the three layers (602/604/606) may be automatically sliced into sub layers as shown in FIG. 6b. There may be any number of sub-layers created, however, the exemplary embodiment of FIG. 6b shows only two sublayers (a and b) for each layer (602/604/606).

The solid freeform fabrication system (100) may then add or subtract certain sub-voxels from layers or sublayers according to any predetermined parameters. The system (100) may be programmed to take into account data surrounding a terrace to determine whether or not to add or subtract certain sub-voxels from the parent voxel. For example, according to the embodiment of FIG. 6c, a first and second sub-voxel (608 and 610) are added to the sublayer (b) of the first and second layers (602 and 604), and a third sub-voxel (612) is deleted from the sublayer (a) of the second layer (604). The terracing effect is accordingly diminished by the addition and/or subtraction of certain sub-voxels, resulting in the final object (600) shown in FIG. 6d.

The solid freeform fabrication system (100, FIG. 1) may be programmed with predetermined parameters to measure terracing between layers and add or subtract certain sub-voxels of certain layers when the parameters between layers are met. The resolution of the resulting object (600) may thereby be greatly enhanced without the need for additional data detailing thinner layers. In addition, as mentioned above, even high-resolution data sets may be further enhanced by implementing a ZRET and adding or subtracting certain sub-voxels of an object. While some implementations of a ZRET produces data savings, ZRET may also be applied without any data savings or compression and merely to enhance the resolution of the resulting object.

Further, high-resolution files may be saved as low-resolution data sets, creating a "virtual" high-resolution file. As mentioned above, high-resolution files may be sent through a low-resolution data transfer, creating the virtual high-resolution file. Thereafter, ZRET may be applied to the low-resolution file to create a high-resolution object (600). It will be understood that ZRET is not limited to the figures shown, and that any algorithm may be applied to automatically add or subtract certain sub-voxels of object data to enhance resolution and reduce terracing in objects made by solid freeform fabrication.

The preceding description has been presented only to illustrate and describe exemplary embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A method of producing an object through solid freeform fabrication, said method comprising ejecting material to form a particular planar layer of said object, said planar layer having a height (h), and, while forming said planar layer and at an edge of said planar layer, varying a quantity of said ejected material applied per unit volume to form a series of steps in said planar layer with heights different than (h);
   wherein said varying further comprises progressively reducing the quantity of a binder or build material applied over a transition region between terraced object layers;
   wherein said reducing further comprises dithering a fluid ejection apparatus that is ejecting said binder or build material.

2. A method of producing an object through solid freeform fabrication, said method comprising ejecting material to form a particular planar layer of said object, said planar layer having a height (h), and, while forming said planar layer and at an edge of said planar layer, varying a quantity of said ejected material applied per unit volume to form a series of steps in said planar layer with heights different than (h);
   wherein said varying further comprises progressively increasing the quantity of a binder or build material over said transition region between terraced object layers;
   wherein said increasing further comprises oversaturating a build material with binder over said transition region.

3. A method of compensating for visual and textural terracing effects of an object created by a solid freeform fabrication system that uses a fluid ejection process to build successive layers of said object being fabricated, said method comprising:
   ejecting material to form a particular planar layer of said object, said planar layer, having a height (h), and, while forming said planar layer,
   applying more ejected material to a layer at a transition between adjacent layers than is applied at a bulk layer material region of said object to form at least one step in said planar layer with a height greater than (h);
   wherein said applying more ejected material further comprises oversaturating a build material with said binder.

4. A method of producing an object through solid freeform fabrication, said method comprising;
   distributing a layer of powdered build material; and
   selectively ejecting a binder into said layer of build material to form a planar cross-section of said object having a height (h);
   wherein selectively ejecting said binder comprises varying a quantity of binder ejected per unit area to form a particular object layer such that variation in said quantity of binder ejected per unit area produces a series of vertical steps in said planar layer with heights different than (h);
   wherein said varying further comprises progressively reducing the quantity of a binder applied over a transition region between terraced object layers;
   wherein said reducing further comprises dithering a fluid ejection apparatus that is ejecting said binder.

5. A method of producing an object through solid freeform fabrication, said method comprising:
   distributing a layer of powdered build material; and
   selectively ejecting two different binders into said layer of build material to form a cross-section of said object;
   wherein one of said binders binds said build material more strongly than another of said binders and said binders are selectively ejected into a layer to reduce terracing with one or more adjacent layers in said object.

* * * * *

UNITED STATES PATENT AND TRADEMARK OFFICE
CERTIFICATE OF CORRECTION

PATENT NO. : 7,497,977 B2 Page 1 of 1
APPLICATION NO. : 10/354538
DATED : March 3, 2009
INVENTOR(S) : Jeffrey A. Nielsen et al.

It is certified that error appears in the above-identified patent and that said Letters Patent is hereby corrected as shown below:

In column 10, line 22, in Claim 3, delete "layer," and insert -- layer --, therefor.

In column 10, line 31, in Claim 4, delete "comprising;" and insert -- comprising: --, therefor.

Signed and Sealed this

Eighteenth Day of August, 2009

David J. Kappos
*Director of the United States Patent and Trademark Office*